United States Patent Office 3,839,480
Patented Oct. 1, 1974

3,839,480
METHOD FOR REMOVING COLOR BODIES FROM METHYLNAPHTHALENE SOLUTIONS
Ronald E. Hassall, Midland, Mich., assignor to The Dow Chemical Company, Midland, Mich.
No Drawing. Filed Oct. 2, 1972, Ser. No. 293,824
Int. Cl. C07c 7/00
U.S. Cl. 260—674 N          10 Claims

ABSTRACT OF THE DISCLOSURE

Removal of color, deep blue, in methylnaphthalenes by hydrogenation of color bodies, particularly the azulenes, over copper chromite catalyst at 60° to 200° C. for 1 to 3.5 hours and pressures of 200 to 600 p.s.i.g. A light brown colored product is obtained which, upon distillation, yields a colorless distillate.

BACKGROUND OF THE INVENTION

Various commercially obtained mixtures of methylnaphthalenes are employed as dye carriers. In most methylnaphthalene mixtures, and particularly those obtained principally as distillation fractions boiling in the 240° to 260° C. range from the heavier and higher boiling aromatics, the major color body is a group of aromatic-like chemical compounds having the general structure:

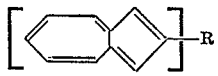

wherein R represents alkyl radicals of 1 to 4 or more carbon atoms, known as azulenes.

The art is knowledgeable of the intense blue color of the azulenes and has suggested several techniques for chemically altering or physically removing the azulenes, as for example, hydrogenation over palladium catalyst (Kremers, R. E., Journal American Chemical Society, Vol. 45, page 717 (1923)), phosphoric acid extraction (Sherndal, H. E., JACS, 37, 167 (1915)), and thermal isomerization (Heilbronner, E., Plattner, P. A., and Wieland, K., *Experienta*, 3, 70 (1947)). None of these procedures was satisfactory for a commercial process, as for example, while palladium is a good hydrogenation catalyst for the azulenes, etc., it does hydrogenate the methylnaphthalenes to varying degrees, an undesirable result. Further, attempts to hydrogenate plant grade methylnaphthalene mixtures results in poisoning of the catalytic activity of the palladium.

In a search to find a commercial process for removing the color from the methylnaphthalene mixture, several additional techniques were tried, among which were hydrogenation over platinum on carbon, fractional distillation, adsorption over silica gel, alumina, activated carbon, and filtrol clays, the latter technique, absorption, having some effect but insufficient to satisfy the dye industry as to color. Diels-Alder adduct formation and oxidation also failed to yield commercially acceptable products.

BRIEF DESCRIPTION OF THE INVENTION

In accordance with the present invention, a mixture of methylnaphthalenes commercially produced during petrochemical refining can be color improved by hydrogenating the mixture over a copper chromite ($CuCrO_4$) catalyst at 60° to 200° C. for 1 to 3.5 hours under 200 to 600 p.s.i.g. without reducing the methylnaphthalene concentration. In addition, if the hydrogenated mixture is vacuum distilled in a single plate still, the color can be improved to nearly colorless product.

The physical state of the catalyst does not appear to be critical; thus, a finely divided form, e.g., powdered, has given as good results in a stirred batch reactor as a pelleted catalyst.

The procedure of the present invention is suitable for hydrogenating azulenes present in methylnaphthalene rich streams without material hydrogenation of the methylnaphthalenes or other aromatic constituents normally found associated with methylnaphthalenes in refinery streams.

DETAILED DESCRIPTION OF THE INVENTION

Example 1

A methylnaphthalene stream obtained from a mixture boiling in the range of 245°–255° C. had the following composition:

| | Wt. percent |
|---|---|
| $C_{4-8}$ | 1.15 |
| Azulene | 0.03 |
| $C_{11}$ Aromatic | 1.17 |
| Naphthalene | 0.25 |
| Ethylidenes | 0.50 |
| Dimethylidenes | 1.46 |
| 2-Methylnaphthalene | 48.11 |
| 1-Methylnaphthalene | 42.57 |
| Biphenyl | 2.94 |
| Methylbiphenyl | 0.12 |
| 2-Ethylnaphthalene | 0.08 |
| $C_{12}$ Aromatic | 1.61 |
| 2,6-Dimethylnaphthalene | 0.02 | was subjected to hydrogenation in a stirred pressure reaction vessel. The catalyst was copper chromite either pelletized or powdered and was added in either 1 or 2 weight percent of methylnaphthalene mixture. The hydrogen pressure, time and reaction temperature are set forth in the table below:

| Run | Percent catalyst | $H_2$, p.s.i.g. | Temp., °C. | Time* hours | Color |
|---|---|---|---|---|---|
| 1 | 2 pellets | 610 | 160 | 20 | Light brown. |
| 2 | 1 pellet | 200 | 170 | 22 (ca. 3) | Do. |
| 3 | 2 powdered | 200 | 170 | 22 (ca. 3) | Brown. |
| 4 | do | 600 | 100 | 22 (ca. 3) | Light brown. |
| 5 | do | 200 | 100 | 22 (ca. 3) | Do. |
| 6 | do | 200 | 100 | 22 (ca. 3) | Do. |
| 7 | do | 200 | 40 | 48 | Dark blue. |

*Run 1 was not checked for color until the run was finished; Runs 2, 3, 4 and 5 were actually run beyond 3 hours but showed no change in color after 3 hours. Run 7 demonstrates the effect temperature has on the reaction, in that if a low pressure is used, the temperature must be in the intermediate or high range to successfully operate the process in a commercially acceptable manner.

The products of Runs 1 and 6 were distilled in a single plate ASTM vacuum distillation column under 4–5 mm. Hg pressure. Colorless products were obtained.

I claim:
1. A method for removing azulene color from 240° to 260° C. boiling range petroleum fraction which comprises selectively hydrogenating the azulene color containing fraction over a copper chromite catalyst at 60° to about 200° C. under a hydrogen pressure of 200 to 600 p.s.i.g. for 1 to 3.5 hours and recovering a fraction substantially devoid of said azulene color.

2. The method of Claim 1 wherein the hydrogenated product is vacuum distilled thereby producing a substantially colorless product.

3. A method for removing azulene color from a methylnaphthalene rich 240° to 260° C. boiling range petroleum fraction which comprises selectively hydrogenating the azulene color containing petroleum fraction over a copper chromite catalyst at 60° to about 200° C. under a hydrogen pressure of 200 to 600 p.s.i.g. for 1 to 3.5 hours and recovering a fraction substantially devoid of said azulene color.

4. The method of Claim 3 wherein the hydrogenated product is vacuum distilled thereby producing a substantially colorless product.

5. The process of Claim 3 wherein the catalyst was present in 1% based on the solution.

6. The process of Claim 3 wherein the catalyst was present in 2% based on the solution.

7. The method of Claim 5 wherein the pressure is 610 p.s.i.g. and the temperature is 160° C. and the catalyst was in the pelleted form.

8. The method of Claim 5 wherein the pressure is 200 p.s.i.g. and the temperature is 170° C. and the catalyst was in the pelleted form.

9. The method of Claim 6 wherein the pressure is 600 p.s.i.g. and the temperature is 100° C. and the catalyst was in the powdered form.

10. The method of Claim 6 wherein the pressure is 200 p.s.i.g. and the temperature is 100° C. and the catalyst was in the powdered form.

References Cited
UNITED STATES PATENTS

| | | | |
|---|---|---|---|
| 2,183,405 | 12/1939 | Olin | 260—674 |
| 3,108,947 | 10/1963 | Stijntjes | 208—264 |
| 2,116,061 | 5/1938 | Dorrer | 208—264 |
| 1,800,159 | 4/1931 | Schroeter | 260—674 |

DELBERT E. GANTZ, Primary Examiner

C. E. SPRESSER, Jr., Assistant Examiner

U.S. Cl. X.R.

208—264; 260—674 H